United States Patent [19]
Coast et al.

[11] 3,713,972
[45] Jan. 30, 1973

[54] NUCLEAR REACTOR POWER PLANT

[75] Inventors: Geoffrey Coast, Sandiway, near Northwich; Kenneth Prince, Bowden; Brian Spruce, Manchester; Vernon Morgan, Warrington, all of England

[73] Assignee: United Kingdom Atomic Energy Authority, London, England

[22] Filed: April 22, 1968

[21] Appl. No.: 722,929

[30] Foreign Application Priority Data

May 12, 1967 Great Britain.....................20,223/67

[52] U.S. Cl.......................................176/60, 176/87
[51] Int. Cl..............................................G21d 1/02
[58] Field of Search...................................176/60, 87

[56] References Cited

UNITED STATES PATENTS

| | | | |
|---|---|---|---|
| 3,371,017 | 2/1968 | Coast et al. | 176/60 |
| 3,410,752 | 11/1968 | Dell | 176/60 |
| 3,470,066 | 9/1969 | Livsey et al. | 176/87 X |
| 3,390,525 | 7/1968 | Spillmann | 176/6 X |

FOREIGN PATENTS OR APPLICATIONS

| | | | |
|---|---|---|---|
| 259,372 | 5/1963 | Australia | 176/60 |
| 1,058,518 | 2/1967 | Great Britain | |

OTHER PUBLICATIONS

Westinghouse Engineer, Sept. 1960, pp. 146–149

*Primary Examiner*—Reuben Epstein
*Attorney*—Larson, Taylor and Hinds

[57] ABSTRACT

A nuclear reactor power plant, wherein the coolant leaves the core for use in a gas turbine or like heat-to-energy converter, has components disposed in closely spaced parallel vertical elongate sealed bores in the wall of a concrete pressure vessel enclosing the reactor. The coolant, preferably carbon dioxide travels from the reactor through said components back to the core by passageways in the wall between the bores and between the bores and the core space of the reactor.

2 Claims, 8 Drawing Figures

NUCLEAR REACTOR POWER PLANT

This invention relates to energy generating systems of the kind comprising a nuclear reactor within a prestressed concrete pressure vessel and with the reactor coolant being used directly in a heat-to-energy converter.

The invention has an application to a $CO_2$ — cooled nuclear reactor with the heated $CO_2$ being utilized to power a $CO_2$ gas turbine. (One arrangement for utilizing nuclear reactor heated $CO_2$ in a gas turbine is described in B.P. No. 1.058.518).

The energy generating system of the kind described according to the present invention comprises a reactor in a concrete pressure vessel and having a coolant circuit with components disposed in cavities within the wall of the pressure vessel, the components being accessible from the outside of the pressure vessel and inter-connected for coolant flow by fluid flow passageways formed in the wall of the vessel and formed by spaces between components and the walls of the cavities.

The communicating passageways not only facilitate rendering the installation safe by keeping the coolant within the concrete pressure vessel but facilitate, as will be brought out later, solutions to the problems of thermal expansion and the mechanical design of the components. In the first instance, the concrete is used to define most of the interconnections so that these are relatively free from thermal expansion problems, and secondly restraints on the design of the feed heater ensure that this is subdivided into a number of mechanically simple parts.

Each installation preferably has a plurality of coolant circuits each comprising such components as turbine stages, generator, cooler, feed heater and compressor, employing a single nuclear reactor core as the heat source, the components being grouped symmetrically around the reactor core.

Other aspects and features of the invention will be apparent from the following description of a 750 Megawatt (electrical) direct cycle gas turbine nuclear reactor installation, which is given purely by way of example with reference to the accompanying drawings in which.

Figure 1:
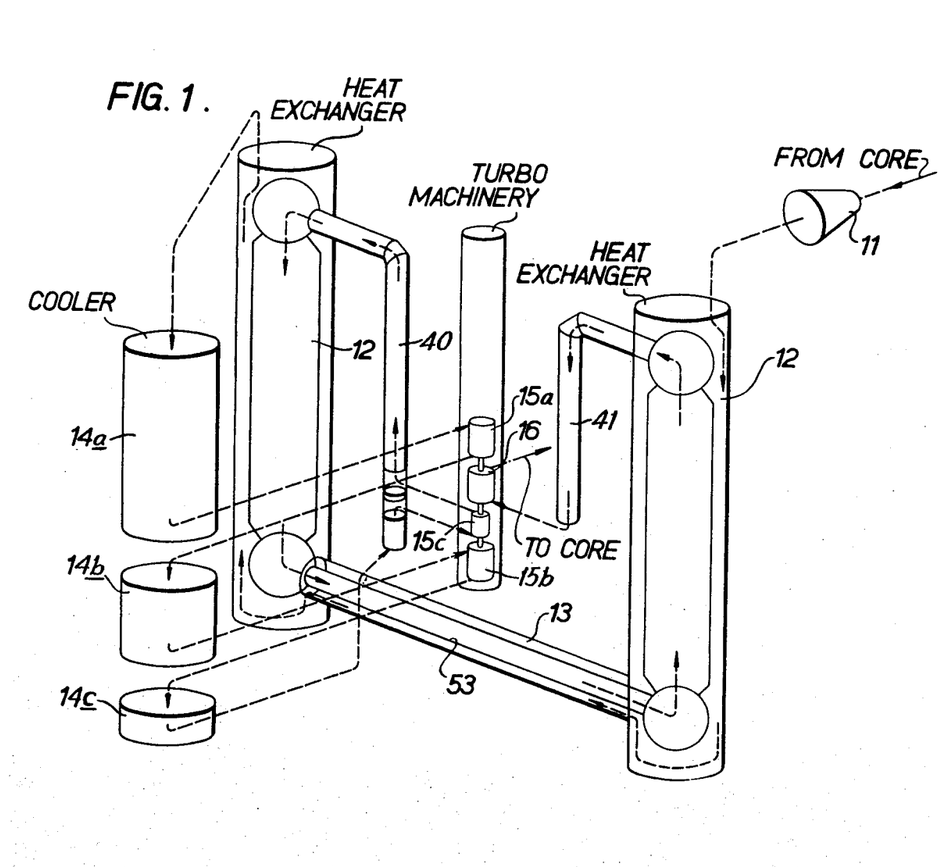
FIG. 1 is a diagrammatic arrangement of the heat utilization circuit for use with a gas cooled nuclear reactor core.
Figure 2:
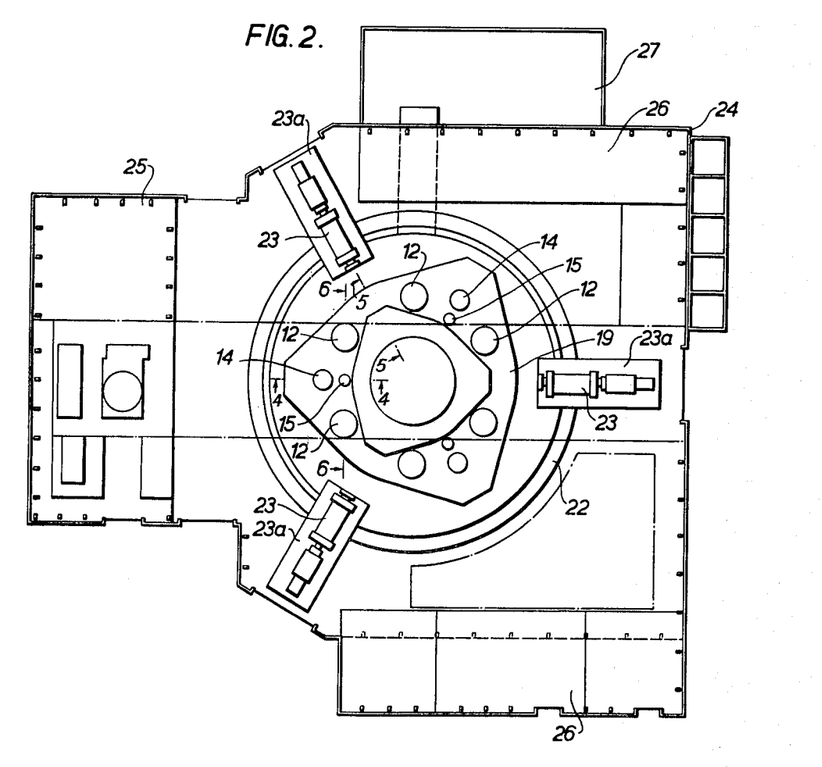
FIG. 2 is a plan view of the installation inside the reactor building.
Figure 4:
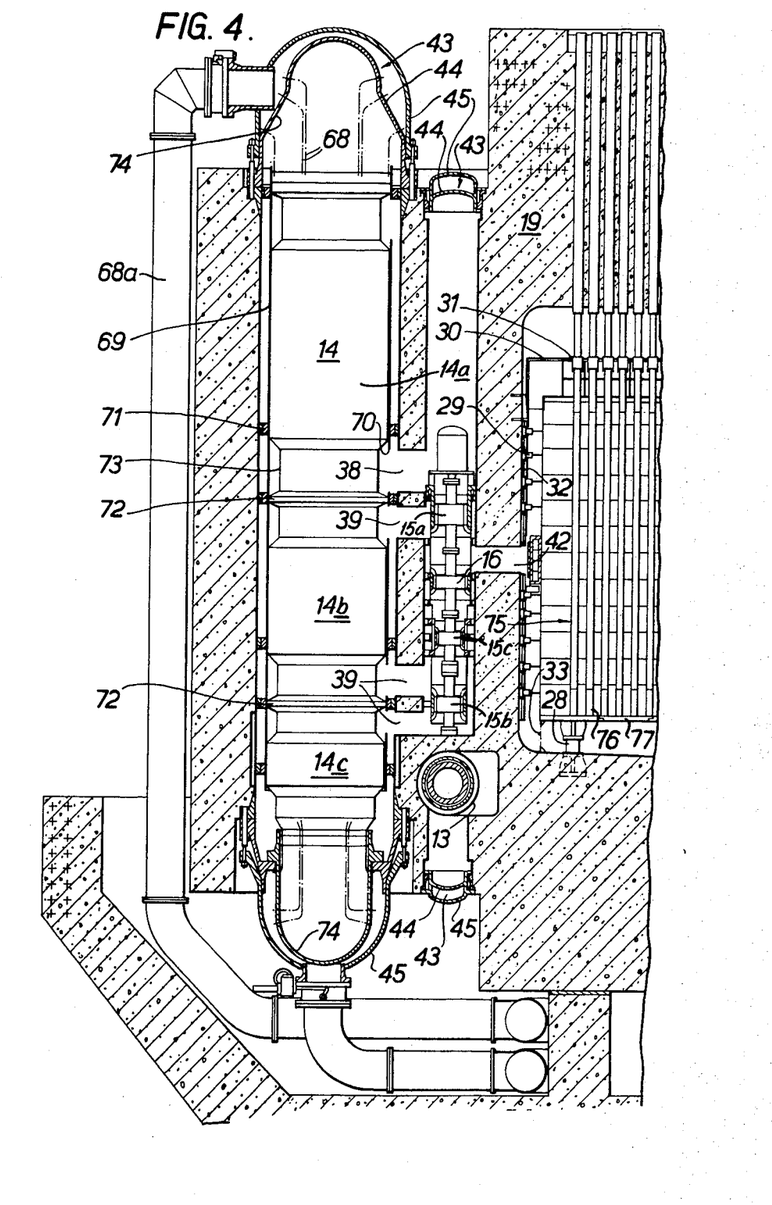
FIG. 4 is a part section on line 4—4 of FIG. 2.

FIG. 4 shows a gas cooled nuclear reactor core 75 in a thick walled concrete pressure vessel 19. Since the various aspects of the invention are directed to the coolant circuits one of these circuits and its components will be described first with reference to FIG. 1. Carbon dioxide coolant gas from the nuclear reactor core at a pressure of 1,005 pounds per square inch, a temperature of 700°C and a density of 2.3 pounds per cubic foot is passed through a first gas turbine stage 11 which drives a generator 23 (FIG. 2) providing the stations output of electricity. A feed heater 12 extracts residual heat energy from the coolant exhausting from the turbine stage 11 at a pressure of 405 pounds per square inch, the coolant gas being reduced from 585° to 120°C. The feed heater 12 is made in two parts joined by two co-axial ducts 13,53. The coolant is then cooled further to 25°C in a pre-cooler stage 14a of a cooler 14 (which is a unitary component having three cooling stages) and then undergoes compression in a compressor stage 15a of a three stage compressor. The three stage compressor also co-operates with interstage coolers 14b and 14c so that the coolant leaves the final compressor stage 15c at a pressure of 2,200 pounds per square inch and a temperature of 95°C. The coolant then passes through the feed heater 12 where it is reheated by the extracted residual heat energy to 495°C thence to a second turbine stage 16 arranged to drive the compressor 15. The compressor 15 and turbine stage 16 are incorporated in a second unitary component. The pressure is reduced to 1,030 pounds per square inch in the turbine 16 and the coolant is then returned to the nuclear reactor core to have its store of heat replenished prior to repeating the cycle, the core at present envisaged is of the type known as the British Advance Gas-Cooled Reactor but could well be a gas-cooled Fast Reactor.

With the large pressure involved, the core space inside the pressure vessel should be kept as small as possible and the turbine stages, the feed heater and the compressor are installed within a group of communicating cavities within the wall thickness of the pressure vessel. There are three parallel coolant circuits each including a feed heater 12 which is made in two parts to enable it to be incorporated within the wall of the pressure vessel. An isolating valve 20 (FIG. 5) is provided in each circuit between the turbine stage 11 and the feed heater 12; in some circumstances isolating valves could be provided at the inlet and outlet of the pressure vessel vault. Alternatively as a safeguard against turbine stage 11 overspeeding on loss of load, a by-pass valve could be used to by pass gas flow around the turbine stage with one or more isolating valves elsewhere in each circuit.

Figure 3:
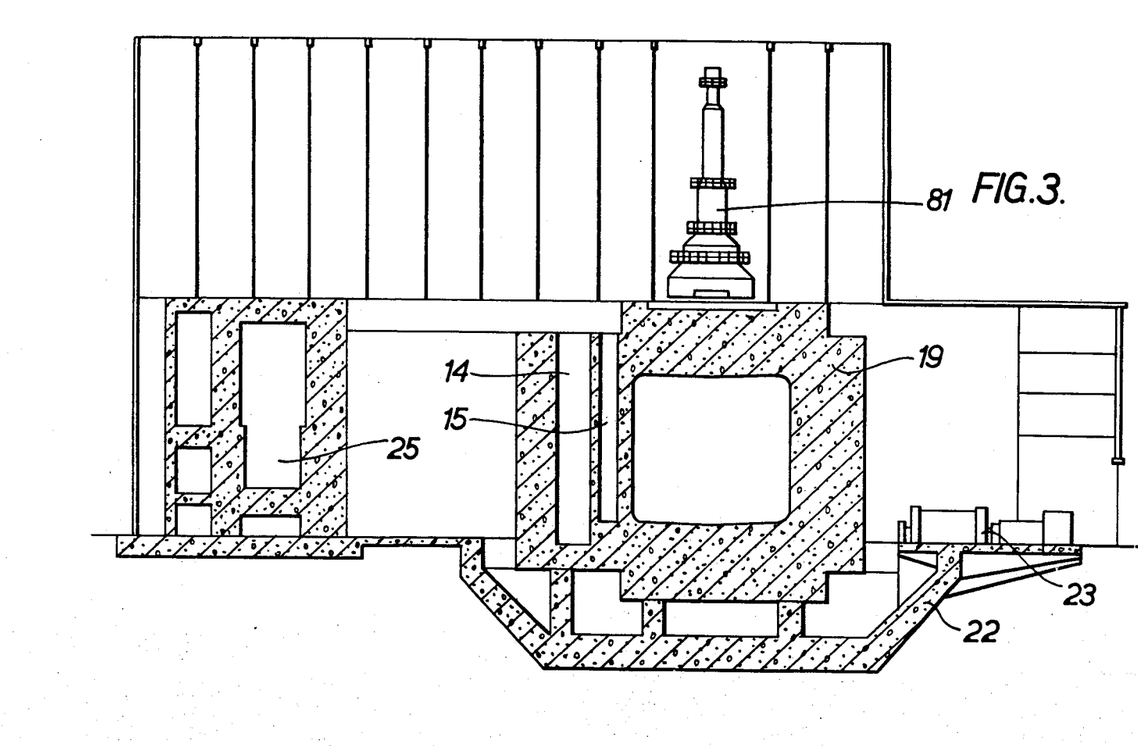
FIG. 3 is an elevational view partly in section.

The reactor installation is built on a monolithic concrete raft 22 having three station output generators 23 on platforms 23a about its periphery. On this raft rests, as shown in FIG. 3, the concrete pressure vessel 19. This vessel is lobed with each of the three parallel coolant circuits associated with a corresponding lobe.

This raft is housed inside a building 24 which provides the usual reactor facilities such as a fuel handling area 25, a services block 26, and electrical transformer compound 27.

Figures 5, 7:
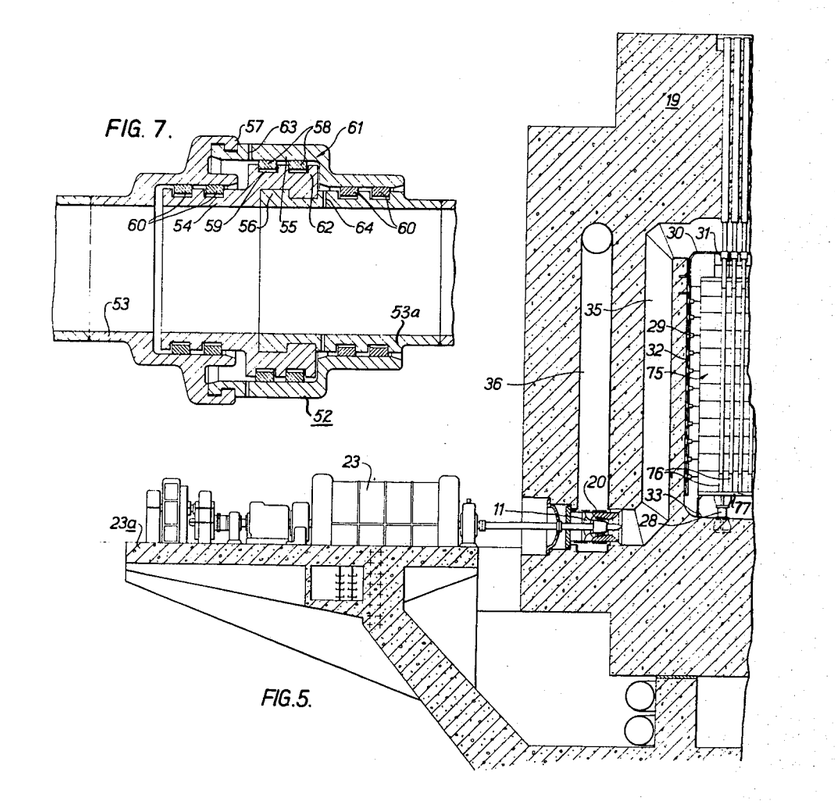
FIG. 5 is a part section on line 5—5 of FIG. 2.
FIG. 7 is a section and illustrates a detail.

FIGS. 4 and 5 are sections through the wall of the pressure vessel showing part of the core of the reactor. The inside or vault of the pressure vessel and the core structure are very similar to that described in U.S. Pat. application Ser. No. 685,874, filed Nov. 27, 1967, by James William Shaw et al., now U.S. Pat. No. 3,544,425, dated Dec. 1, 1970. The core structure 75 is supported in columns 76 on a layer 77 of plates which are supported either directly each by a pillar 28 or by bridging between two pillar supported plates with some freedom for thermal expansion, wherein the core is constrained against outward movement by restraints 29 on the vessel and wherein a steel diaphragm 30 separating the coolant inlet and coolant outlet above the core proper carries laterally resilient devices 31. The main differences are that better thermal insulation is provided for the walls of the pressure vessel in the form of packs of 0.004 inch thick stainless steel foil (not shown) in addition to neutron shielding 32, and that the coolant enters only at one level dividing into re-entrant coolant to cool the moderator and channel coolant within the vault so that a pressure reducing baffle-skirt 33 has to be provided between the layer and the floor of the vault to cause the re-entrant moderator coolant to be drawn down through the core.

Figure 6:
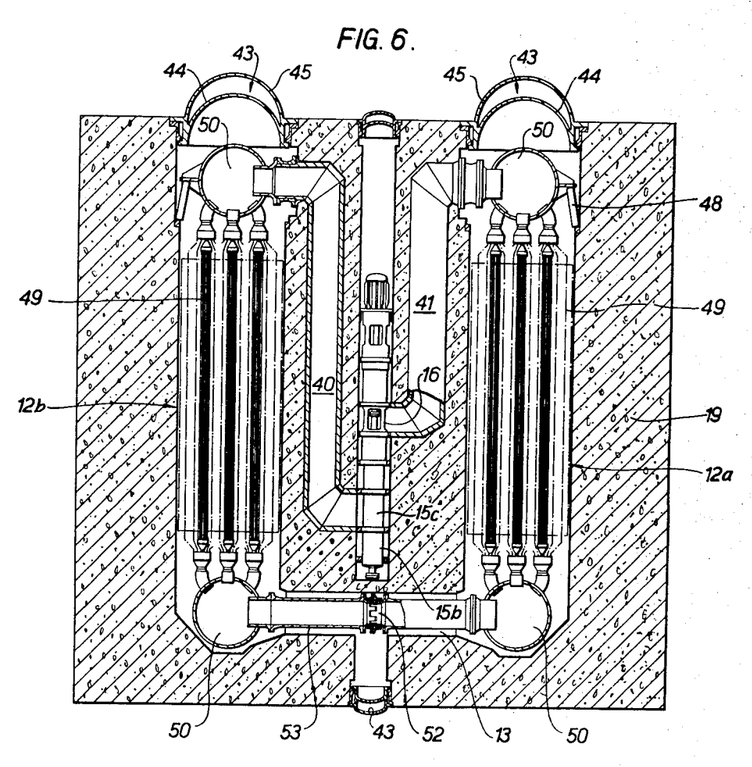
FIG. 6 is a section along line 6—6 of FIG. 2.

The coolant outlet from the vault is a passageway 35 (FIG. 5) to the turbine stage 11 from whence a riser 36 leads to the feed heater 12 (FIG. 6) wherein the first pass is down through a first part 12a of the feed heater 12 through the outer annular part of the duct 13 into and up the second part of the feed heater 12 to a further duct (not shown in FIGS. 4 to 6) into the precooler 14a (FIG. 4). The precooler outlet is connected to the compressor 15a through a penetration 38 in a partition which is that part of the pressure vessel wall which separates them. The various stages of the compressor 15 are separated by dividing partitions 72 (FIG. 8) to direct the gas through further penetrations 39 (FIG. 4) to the interstage coolers 14b, 14c. The high pressure outlet of the compressor 15c is connected by a duct 40 to the high pressure flow path through the second and first parts 12b, 12a of the feed heater 12. Flow from the second part to the first part is through the central duct 13. The outlet of the feed heater 12a is connected by a duct 41 via the second turbine stage 16 to the coolant inlet 42 to the vault. As will be seen from FIGS. 4 to 6 the unitary components are installed in a plurality of cavities in the wall of the concrete pressure vessel 19. The components are interconnected in the coolant circuit by passageways in the wall.

These cavities are each sealed by a closure gap 43 having an inner perforated closure 44 and an outer perfect closure 45 so designed that if the outer perfect closure ruptures then the inner closure will limit the escape through it to a low value. Access to the unitary components from outside the pressure vessel is gained by removing cap 43. The compressor is preferably of the type using gas bearings with the gas bearing pressure provided by the high pressure coolant.

The feed heater as stated is divided into two parts within each of the three parallel circuits. Each part is in itself a substantial heavy structure and is supported partially by the high pressure connection (inlet or outlet) into it and partially by movable supports 48 that is by members which can tilt to take up horizontal expansion without vertical movement). The high pressure flow path through the feed heater is defined in each part by tubes 49 extending between spherical headers 50. These tubes are headered into 133 bundle headers each receiving 223 tubes. 19 of these bundle headers are connected by way of each of seven manifolds into the spherical headers. Since the two parts are capable of differential amounts of thermal expansion relative to each other the duct has to cope with these movements. The duct is thus interrupted by an expansion joint 52 which is designed to accept the axial force due to the high pressure so that the two parts of the feed heater are not forced apart.

As shown in FIG. 7 the duct 53 comprises two tubes 53a joined end-to-end by the expansion joint 52. This expansion joint consists of two co-axial sleeves 54 and 55. The innermost 54 of the two sleeves engages an external bayonet type coupling 56 on one tube 53a and the outermost sleeve 55 engages a bayonet type coupling 57 on the other tube 53a. These sleeves can slide one within the other being sealed together by rings 58 in ring grooves 59. Each sleeve can slide relative to the opposed tube 53a being sealed to it by rings 60. The outermost sleeve has an enlarged diameter region 61 where it co-operates with the rings 58 sealing it to the inner sleeve and the inner sleeve has an enlarged outside diameter part 62 in this region which thus divides the region into two compartments of which that nearest the bayonet coupling 57 is vented to the outside of the duct by a vent 63 and the other is connected by a bore 64 to the inside of the duct. The design of the coupling is such that the pressure transmitted through this bore acts on areas equal in size to the cross-section of the bore and acts through the bayonet coupling to pull the two parts of the duct together with the same force as is tending to part them. It is permissible for this coupling to leak slightly say to the extent of 0.1 percent of the designed mass flow. For reasons of space it may be desirable to waist the tube 53 in the region of the joint.

Figure 8:
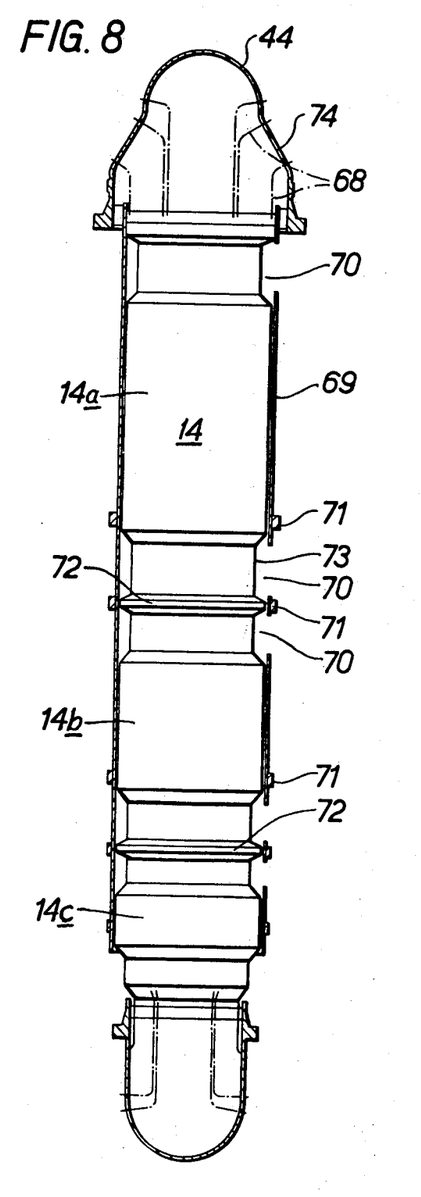
FIG. 8 is an axial section through a heat exchanger device used for pre-cooling and interstage cooling of a gas being compressed.

The unitary components 14 having cooler stages 14a 14b 14c has cooling water pipes 68 fed from a cooling water main 68a (FIG. 4), each pipe 68 extending in a single substantially straight run down inside an outer shroud 69. This particular embodiment was designed for sea water cooling and therefore the cavity is spaced away from the vault by as much concrete acting as neutron shielding as possible. These pipes are arranged in groups of 19 pipes on a triangular lattice pitch and where the pitch is to be reduced as in the higher pressure intercoolers, this is achieved by reducing the pitch within each group and providing baffles between the groups. The shroud 69 has ports 70 in it which align with the penetrations and carries seals 71 which co-operate with shutter tube lining the cavity to define discrete gas plenums for the stages. The dividing partitions between the pre-cooler and the various interstage coolers are provided by hexagonal collars which are permitted a degree of axial movement relating to the pipes but which fit as tightly as possible on the pipes and co-operate with each other to provide a fair seal. Similar partitions are provided at each end of this heat exchange device. In the regions of the inlets and the outlets, the pipes within each group are pinched snugly together as at 73 to leave spaces between the groups through which the gas can penetrate through the cavity. In addition to the partitions at the ends of the heat exchange device, the ends are sealed by thimbles 74 through which the water pipes extend. These thimbles are constitute some of the inner perforated closures 44 shown in FIG. 4. The internal bore of the pipes can be cleaned by wire moles or go-devils fired down the pipes as by compressed air.

Servicing arrangements for the various components need not be permanently installed since a charge machine structure 81 (FIG. 3) possibly with temporary attachments could be used to withdraw the compressors, feed heaters parts, or the heat exchange devices.

What we claim is:

1. A nuclear reactor installation comprising:

a thick walled concrete pressure vessel;

a gas-cooled nuclear reactor core housed within the vessel;

a plurality of unitary heat utilization circuit components each withdrawably housed in one of a plurality of cavities in the vessel wall, and means defining passageways in the wall of the vessel, the passageways interconnecting the reactor core and the components to form a closed coolant circuit for the reactor;

at least one of the unitary components comprising a multi-stage compressor and turbine unit and having external sealing members engaging the wall of the cavity to define discrete gas plenums for the stages, the plenums being interconnected for gas flow with other components of the circuit by way of the passageways in the wall.

2. A nuclear reactor installation according to claim 1 wherein the closed coolant circuit includes a gas turbine housed within a cavity in the wall of the pressure vessel, the gas turbine being coupled to drive an electrical generator disposed outside the pressure vessel.

* * * * *